United States Patent [19]

Ashton

[11] 4,038,514
[45] July 26, 1977

[54] VERTICAL WELDING OF THICK ALUMINUM MEMBERS

[75] Inventor: Richard F. Ashton, Richmond, Va.

[73] Assignee: Reynolds Metals Company, Richmond, Va.

[21] Appl. No.: 546,217

[22] Filed: Feb. 3, 1975

[51] Int. Cl.² .............................................. B23K 9/12
[52] U.S. Cl. ................................. 219/126; 219/73 R; 219/137 R
[58] Field of Search .................... 219/118, 126, 137 R, 219/73; 228/263

[56] References Cited

U.S. PATENT DOCUMENTS

| | | | |
|---|---|---|---|
| 2,812,419 | 11/1957 | Chyle | 219/118 |
| 2,817,748 | 12/1957 | Meyer | 219/126 |
| 3,047,713 | 7/1962 | Liptak | 219/118 |
| 3,303,321 | 2/1967 | Harmsen et al. | 219/126 |
| 3,515,844 | 6/1970 | Colarossi et al. | 219/137 R |
| 3,681,565 | 8/1972 | Fisher | 219/126 |

*Primary Examiner*—Bruce A. Reynolds
*Assistant Examiner*—N. D. Herkamp
*Attorney, Agent, or Firm*—Glenn, Palmer, Lyne & Gibbs

[57] ABSTRACT

An apparatus for and method of welding aluminum members substantially vertically is provided wherein a groove-defining surface is formed on each of the members and such members are positioned adjacent each other with the groove-defining surfaces cooperating to define a substantially vertically extending groove. A gas-metal arc torch having a consumable electrode and means for supplying a shielding gas therearound is placed with the electrode in the groove, whereupon a welding arc is generated and the torch is moved substantially vertically along the groove while holding the torch at a backhand torch angle. The consumable electrode and shielding gas are fed at predetermined rates therefor while moving the torch and welding arc substantially vertically along the groove to produce weld metal in the groove having an outside oxide support skin and the oxide support skin is the only support required for the weld metal during its solidification.

1 Claim, 12 Drawing Figures

VERTICAL WELDING OF THICK ALUMINUM MEMBERS

BACKGROUND OF THE INVENTION

In aluminum fabrication employing comparatively thick (0.5 inch to 4 inches) members it is often desirable and/or necessary to weld such members together. Heretofore, such welding has been done primarily using the well known so-called multipass gas-metal arc process employing numerous weld passes which are time consuming and conducive to interpass weld defects whereby the welding costs are excessive.

One welding technique which has been used to increase productivity is to position the aluminum members which are to be welded substantially flat whereupon higher welding currents may be used and such currents are substantially greater than the currents that could possibly be used if the members were to be positioned other than flat whereby the number of welding passes, problems, and costs associated therewith may be reduced. However, it is not always possible to position members which are to be welded substantially flat and, in many applications the only way that the welding can be done practically is to position the aluminum members substantially vertically with each weld also extending substantially vertically along the vertical members.

Because of the large mass of molten metal produced during vertical welding and the tendency of such molten metal to fall under the influence of gravity, attempts have been made heretofore to achieve vertical so-called electrogas welding using devices such as sliding shoes, or the like, with such sliding shoes serving to retain the molten metal along the weld until its solidification. However, the main problems in using weld metal retaining sliding shoes are that the sliding shoes must be of special construction and thus are comparatively expensive, and it is necessary to use comparatively sophisticated and hence expensive equipment to move the shoes in a controlled manner. Another problem with the use of sliding shoes is that the partially solidified weld is easily torn by the shoes. Still another problem with the use of sliding shoes is that the strength of welds produced using such shoes has been marginal.

SUMMARY

This invention provides an apparatus for and method of welding vertically comparatively thick aluminum members which overcome the above-mentioned problems utilizing commercially available gas-metal arc equipment and without requiring expensive special equipment yet providing welds having high structural strength and integrity.

A groove-defining surface is formed on each of the members and such members are positioned adjacent each other with the groove-defining surfaces cooperating to define a substantially vertically extending groove. A gas-metal arc torch having a consumable electrode and means for supplying a shielding gas therearound is placed with the electrode in the groove, whereupon a welding arc is generated and the torch is moved substantially vertically along the groove while holding the torch at a backhand torch angle. The consumable electrode and shielding gas are fed at predetermined rates therefor while moving the torch and welding arc substantially vertically along the groove to produce weld metal in the groove having an outside oxide support skin and the oxide support skin is the only support required for the weld metal during its solidification.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which.

DETAILED DESCRIPTION

Figure 2:
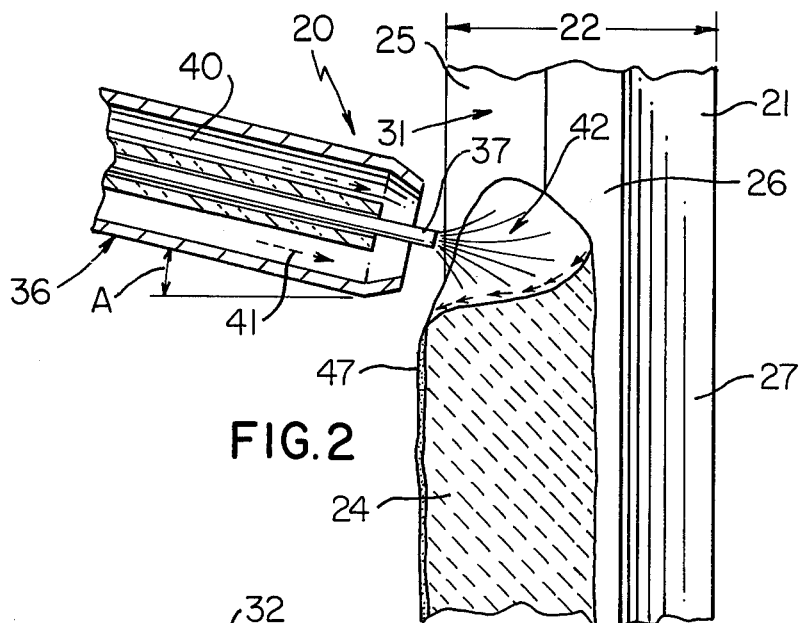
FIG. 2 is an enlarged view with parts in elevation, parts in cross section, and parts shown schematically illustrating the apparatus for and method of this invention.
Figure 4:
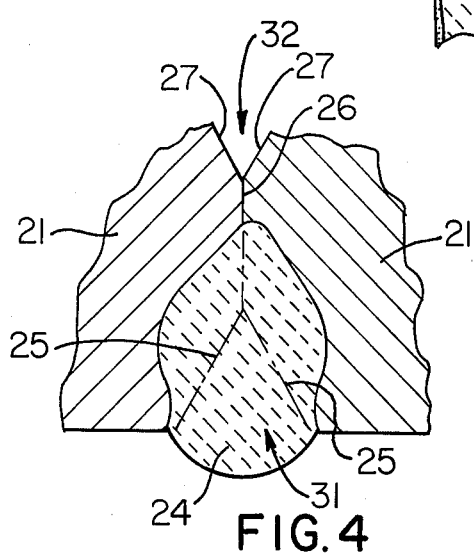
FIG. 4 is a fragmentary view similar to FIG. 3 after cleaning of the oxide support skin from the outside surface of the weld.
Figure 1:
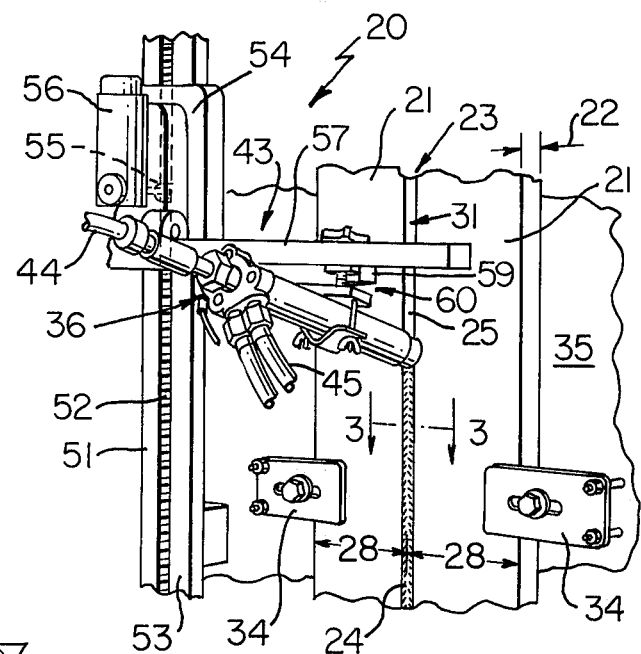
FIG. 1 is a fragmentary perspective view particularly illustrating a pair of exemplary members or plates being welded substantially vertically in accordance with the teachings of this invention.

Reference is now made to FIGS. 1 and 2 of the drawings which illustrate an exemplary embodiment of an apparatus and method of this invention designated generally by the reference numeral 20 and being particularly adapted for welding a plurality of two substantially vertically arranged or extending aluminum members each designated by the same reference numeral 21. Each member 21 of this example is a plate member and has a thickness 22 of at least 0.5 inch and such thickness 22 may be as thick as 4 inches and even thicker. This invention enables welding of the members 21 in a simple and economical manner to produce a high-strength structure 23, using in essence, a single vertical welding pass along each side of the members without requiring special equipment to contain the weld metal, and the weld 24 which is produced is of high structural strength and substantially free of the type defects which are common in similar welds produced heretofore using either such special equipment or a plurality of overlapping weld passes.

The method 20 comprises providing at least one groove-defining surface 25 in each of the members 21; however, in this example a land-defining surface 26 as well as another groove-defining surface 27 is provided in each member 21. The land-defining surfaces 26 and groove-defining surfaces 25 and 27 in each member 21 are shown as planar surfaces with the groove-defining surfaces 25 and 27 each being arranged substantially transverse their land-defining surface 26 and adjoining opposite edges thereof. However, the groove-defining surfaces 25 may be curved or have other configurations, and the land-defining surfaces may also have other configurations as will be explained subsequently.

For simplicity of presentation the members 21 of this example are shown as a pair of comparatively elongated or tall flat plate members which are arranged substantially vertically, with each having a comparatively small width 28; however, it will be appreciated that such members may have any desired configuration and width.

Figure 3:
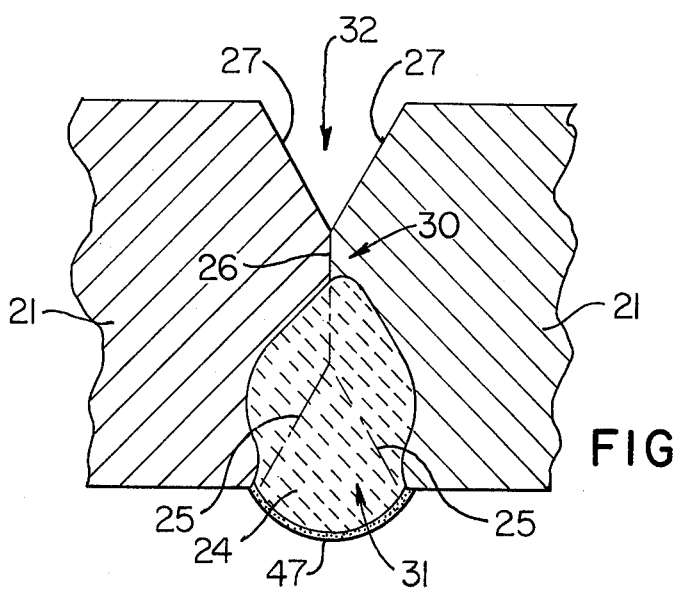
FIG. 3 is a fragmentary cross-sectional view taken essentially on line 3—3 of FIG. 1 and particularly illustrating an outside oxide support skin of the weld which serves as the only support for the weld metal during solidification thereof.
Figure 5:
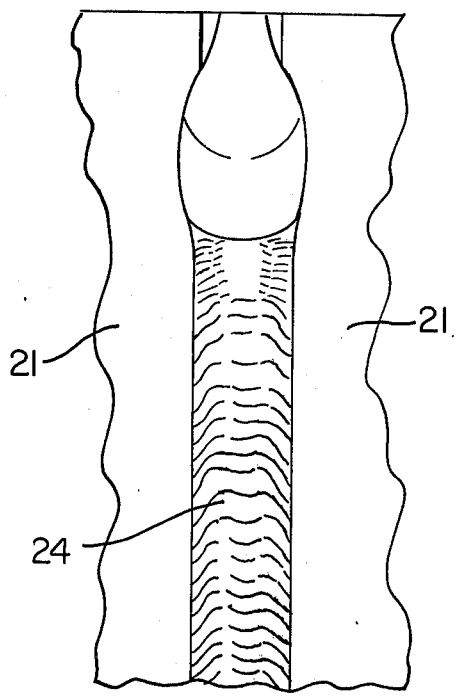
FIG. 5 is a view looking perpendicularly toward the members of FIG. 1 with the welding action stopped near the top of the members being welded and illustrating the weld after cleaning thereof.

The members 21 are positioned adjacent each other with their land-defining surfaces 26 against each other in face-to-face contact as shown at 30 in FIG. 3 and with the groove-defining surfaces 25 cooperating to define a groove 31 while the groove-defining surfaces 27 cooperate to define a groove 32 and in this example the grooves 31 and 32 are substantially vertically extending grooves.

The members 21 are supported in their substantially vertical positions by fastening devices which may include a pair of fastening devices each designated generally by the reference numeral 34. The fastening devices 34 of this example serve to fasten the members 21 to an associated support 35. However, it will be appreciated that any suitable means may be used to hold the members 21 to enable welding thereof.

With the members 21 thus positioned a gas-metal arc torch 36 of any suitable known construction is provided and as best illustrated in FIG. 2 and the torch has a consumable electrode 37 and means 40 for supplying a shielding gas indicated schematically by dotted arrows 41 around such electrode 37 with the electrode 37 being positioned within one of the grooves shown as the groove 31 in this presentation. The torch 36 is energized using well known techniques to generate a welding arc, shown at 42, whereupon the torch is moved substantially vertically by an apparatus 43 along the groove 31 while holding the torch 36 at which is popularly referred to in the art as a backhand torch angle. In this example, the backhand torch angle is shown at A in FIG. 2 as an angle of 12° from a horizontal plane.

The consumable electrode 37 is fed through a conduit 44 at the rear of the torch 36 and then axially through such torch; and, the shielding gas 41 is fed through a suitable flexible conduit 45 so that it enters the rear portion of the torch 36 and flows axially forwardly along such torch exiting the torch 36 so that it envelopes the electrode 37 at the torch outlet. The electrode 37 and the shielding gas 41 are fed through the torch 36 at predetermined rates therefor while moving the torch 36 and its welding arc substantially vertically along the groove 31 to produce weld metal, also designated 24 in its molten form, in the groove 31 with such weld metal having an outside oxide support skin 47, see FIGS. 2 and 3, which forms and cools instantly. The rates or amounts of electrode 37 and of shielding gas 41 required for welding will be described and discussed in detail subsequently.

The method of this invention is unique in that the oxide support skin 47 is the only support required for the weld metal 24 while such weld metal solidifies in its associated groove which in the example of FIG. 3 shows weld metal solidified in the groove 31.

Figure 6:
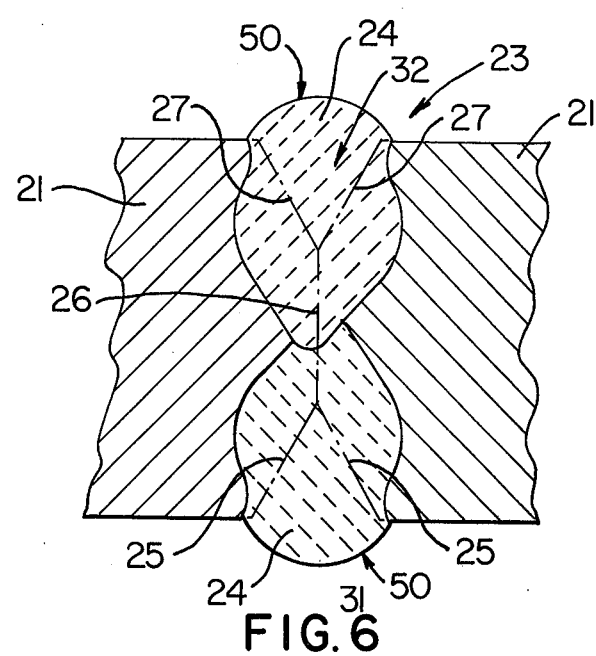
FIG. 6 is a fragmentary cross-sectional view particularly illustrating the vertical plate members of FIG. 1 after welding vertically along opposed vertical grooves defined therein.

The above-described steps of, placing a gas-metal arc torch such as the torch 36 with its consumable electrode 37 and means 40 for supplying a shielding gas therearound, generating of a weld arc, moving the torch substantially vertically while holding the torch at a backhand torch angle, and feeding the consumable electrode and shielding gas at predetermined rates therefor while moving the torch and its welding arc substantially vertically are repeated in the other groove 32 to produce weld metal (also designated 24 in its molten and solid form) which also has an oxide support skin which is the only support required for weld metal 24 in the groove 32 while it solidifies. A fragmentary portion of the resulting completed weld structure 23 is shown in FIG. 6 and it will be seen that such structure 23 is comprised of only two welds 24 having outwardly convex weld surfaces 50 and with the original land-defining surfaces 26 and groove-defining surfaces 25 and 27 (shown by dot-dash lines) being completely molten in the welding process.

The welding of members 21 to define the weld 24 in the groove 31 may be achieved utilizing any suitable apparatus; however, such welding is preferably achieved utilizing either the apparatus 43 or one very similar thereto. In particular, it will be seen that the apparatus 43 includes a vertically supported toothed rack 51, see FIG. 1, having a plurality of teeth 52 and the rack 51 is suitably supported on a support 53. The apparatus 43 includes a vertically slidable carriage or device 54 which is adapted to move along the rack 51 and the device 54 rotatably supports a pinion 55 and a reversible electric motor 56 operatively connected thereto. The device 54 has a substantially horizontally extending arm 57 which supports the torch 36. During normal operation the motor 56 is energized and rotated in one direction causing vertically upward movement of the torch 36 along an associated groove, and once the welding has been completed along such groove, the motor is reversed and the device 54 positioned at the bottom of another groove for repetition of the operation. The motor 56 may also operate through a suitable clutch and at the completion of its vertical movement the clutch may be disengaged and the device rapidly positioned manually at the bottom of another groove.

The torch 36 is supported by the apparatus 43 and in particular is supported by an adjustable support or bracket assembly 60 carried on arm 57 of device 54 and the support 60 may be adjusted either manually or automatically to pivot or rotate the torch about a horizontal reference axis. The apparatus 43 may have a suitable automatic control means or device 59. The control means 59 may have a suitable sensor (not shown) which operatively associates with the area at 42 of the welding arc and the control means 59 may have suitable control connections to the conventional current controller to provide automatic adjustment of welding current, to the automatically adjustable support 60 to provide automatic adjustment of the torch angle A, to the conventional electrode feed means to control the rate of feed of the consumable electrode 37, to the conventional shielding gas supply means to control the flow of shielding gas 41, and to the device 54 to control the rate of movement of the torch 36 vertically along its groove to provide fully automatic control of the welding operation. The above-mentioned conventional current controller, conventional shielding gas supply means, and conventional electrode feed means are all well known and have not been illustrated. It will also be appreciated that the support 60 is also adjustable to an infinite number of positions horizontally along its supporting arm 57 to assure precise positioning of the torch 36 relative to an associated groove.

The weld along the groove 32 may be provided by the apparatus 43 or a similar apparatus after the weld along the groove 31 has been completed or the welding action may be achieved substantially simultaneously using apparatus 43 on one side of the members 21 and a similar apparatus 43 (not shown) on the opposite side of the members 21 with the apparatus 43 illustrated in FIG. 1 being operated so that its torch 36 is slightly in advance of, i.e., above, the torch 36 utilized along the groove 32 to assure that a solid weld structure is provided along groove 31 before commencing the welding action along groove 32. Nevertheless, regardless of whether the welding along opposed surfaces of the members 21 is achieved first on one side and then on the other or simultaneously as outlined above, the resulting completed weld structure 23 is defined by members 21 having a pair of main welds 24 each having an outwardly convex weld surface 50, and each weld surface 50 is shown in FIG. 6 with its oxide support skin cleaned therefrom.

Figure 7:
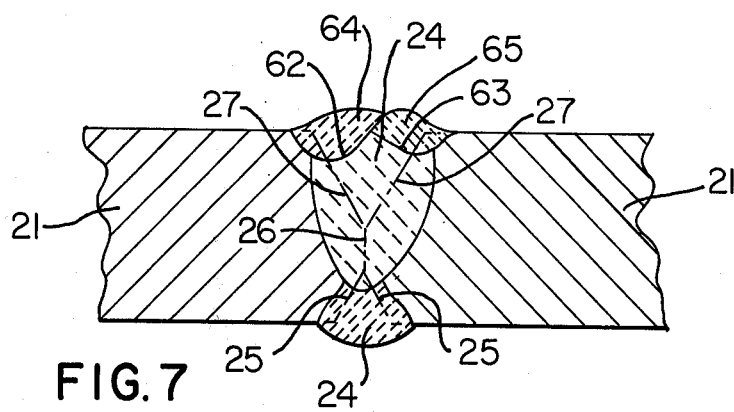
FIG. 7 is a view similar to FIG. 6 particularly illustrating a pair of plate members which have been welded in accordance with this invention and utilizing a pair of main welds together with a pair of cover welds associating with one of the main welds.

Basically, and assuming a given amount of electric power being used, the configuration of the main welds 24 is generally dependent upon the thickness of the members 21 being welded, the rate of feed of the consumable electrode 37, the amount and type of shielding gas 41 used therewith, and the speed of vertical movement whereby in some instances a comparatively large main weld, also designated 24 in FIG. 7, is defined on one side with such main weld 24 having opposed arcuate surfaces 62 and 63, as viewed in cross section, extending along its vertical height. These arcuate surfaces are produced by underfilling which is aggravated by surface tension of the oxide support skin 47. The underfilling is simply remedied by cleaning the oxide coating using any suitable technique such as a wire brush, or the like, and applying a pair of cosmetic or cover welds 64 and 65 over the arcuate surfaces 62 and 63 respectively. The cover welds 64 and 65 being comparatively small in volume may be applied comparatively rapidly using a conventional forehand torch angle. The comparatively small volume main weld 24 on the opposite side of the members 21 of FIG. 7 is similar to the larger main weld 24 and does not require cover welds in association therewith because of its small volume; and, such small volume weld may, if desired, be deposited using a conventional forehand torch angle. It will also be appreciated that the land-defining surface 26 and groove-defining surfaces 25 and 27 are obliterated by the welding process.

Figure 8:
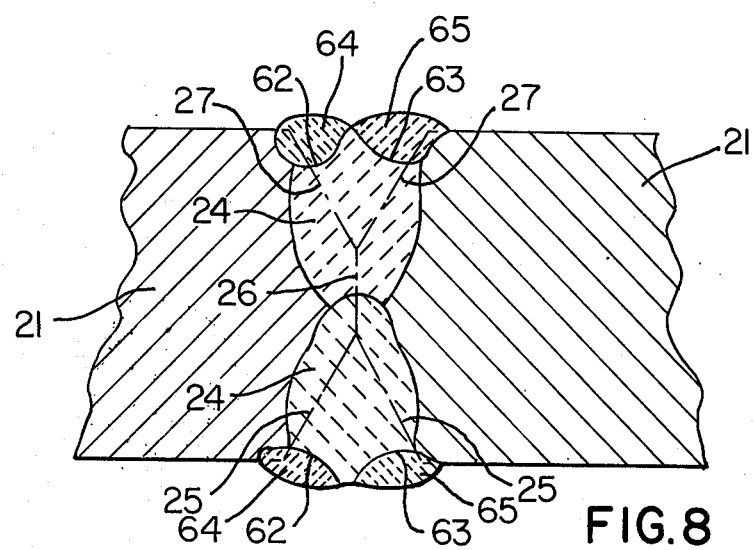
FIG. 8 is a view similar to FIG. 6 illustrating a pair of plate members which have been welded in accordance with this invention and utilizing a pair of main welds together with a pair of cover welds in association with each main weld.

The configuration illustrated in FIG. 7 has been presented to illustrate the manner in which one of a pair of main welds 24 may require the utilization of cover welds which are rapidly applied to complete the weld structure. However, for a comparatively thicker structure as illustrated in FIG. 8 a pair of members 21 may utilize a pair of main welds 24 and each of the main welds 24 may, in the process of being formed, have underfilled arcuate surfaces 62 and 63 vertically therealong whereupon each of the main welds 24 may use a pair of cosmetic or cover welds 64 and 65 respectively for filling the underfilled arcuate surface areas 62 and 63 respectively to define the weld configuration illustrated. Once again it will be seen that the land-defining surfaces 26 as well as the groove-defining surfaces 26 and 27 have been obliterated in the process of completing the weld structure.

The land-refining surfaces 26 on each member 21 need not necessarily be arranged substantially perpendicular to the opposed planar surfaces of each member 21 in the initial positioning of a pair of members to be welded. To highlight this point, reference is now made to FIG. 9 of the drawings which is similar to FIG. 6 and wherein each land-defining surface 26 extends at an obtuse angle from an associated outside surface of its member 21. Further, one of the groove-defining surfaces 25 associated with groove 31, for example, is a continuation of the land-defining surface 26 of one member 21 and one of the groove-defining surfaces 27 associated with the groove 32 in a continuation of the land-defining surface 26 of the other member 21. It will be noted that the main welds 24 illustrated in FIG. 9 have outwardly convex surfaces similar to corresponding weld surfaces of FIG. 6 and are also designated by the reference numeral 50.

Figure 9:
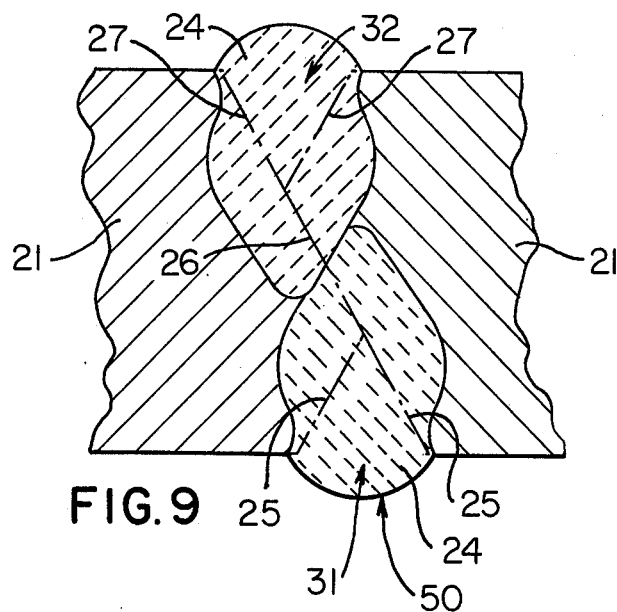
FIG. 9 is a view similar to FIG. 6 wherein two planar surfaces are arranged in each of a pair of members so as to define a common land and a pair of opposed grooves.

Grooves 31 and 32 of the character shown in FIG. 9 may be defined so as to require a pair of cover welds with one of the main welds in a similar manner as illustrated in FIG. 7 or a pair of cover welds with each of the main welds 24 in a similar manner as shown in FIG. 8; and the land-defining surfaces 26 need not necessarily have the illustrated angular relationship to the opposed surfaces of their members 21 but may extend at any other suitable angular relationship. Further, surfaces 26 need not necessarily be planar surfaces but but may be interlocking surfaces, or the like, such as sawtoothed, arcuate, tongue-and-groove, and similar structures. Nevertheless, once the welds are defined, the various land-defining surfaces and groove-defining surfaces are obliterated and the welds defined of molten weld material comprised of parent metal and electrode material.

The method of this invention utilizes to optimum advantage the high thermal conductivity of aluminum and its inherent ability to form an oxide whereby the oxide support skin 47 is substantially instantaneously defined. Further, no so-called "back-chipping" is necessary to achieve good tie-in of each main weld.

This invention has, as its primary features, the use of a backhand torch angle, inert gas shielding (preferably helium), and welding currents which are considered comparatively low for the amounts of aluminum deposited. Typical welding conditions for welding 1-11/16 inch and 1 inch thick 5083-0 aluminum alloy plate with 5183 electrodes are given in the following Table I of typical welding conditions. It will be noted that both 1/16 inch and 3/32 inch electrodes may be used.

TABLE I

TYPICAL WELDING CONDITIONS

| Plate Thickness, In. | Gas And Flow Rate cfh | Electrode In. | Backhand Torch Angle, ° | Weld Current, Amps | Arc Volts | Weld Travel ipm | Wire Electrode Feed Speed imp |
|---|---|---|---|---|---|---|---|
| 1-11/16 | Helium 125 | 5183 3/32 | 12 | 308–312 | 34–35 | 5.2 | 197 |
| 1-11/16 | Helium 150 | 5183 1/16 | 12 | 304–312 | 32–34 | 5.4 | 412 |
| 1 | Helium 125 | 5183 1/16 | 7 | 236–244 | 31–33 | 5.7 | 415 |

The above table I presents certain examples of typical welding conditions; however, more general conditions of operation in accordance with the present invention involve using weld currents ranging between roughly 200 and 400 amperes, arc voltages ranging between roughly 20 and 40 volts, and weld travel ranging between roughly 3 and 10 inches per minute (ipm).

Figure 10:
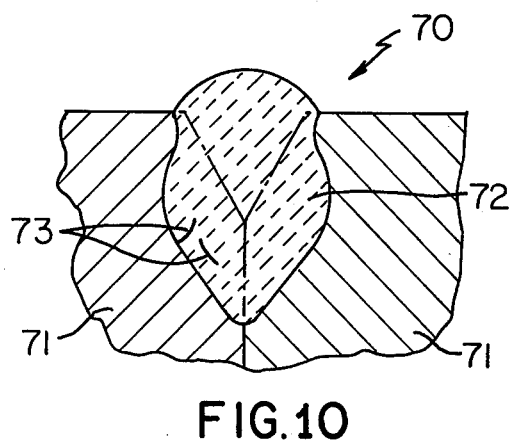
FIG. 10 is a fragmentary cross-sectional view showing a defective weld due to oxide films being present in the weld as a result of using an unsatisfactory shielding gas.

As mentioned above torch angle is one of the primary features of this invention. Angles ranging between 12° forehand to 18° backhand have been investigated and it has been found that the use of a 0° to 12° forehand angle resulted in arc impingement on molten metal which caused considerable spatter and turbulence. As a result of this spatter and turbulence the molten aluminum did not flow smoothly and oxide films became entrapped in the deposit. To highlight this undesirable entrapment of oxide films in the weld deposit, reference is made to FIG. 10 of the drawings, which illustrates a weld structure 70 wherein a pair of 1-11/16 inch thick test members 71 of 5083-0 aluminum alloy were welded vertically upwardly along a groove similar to groove 31 of members 21 using a forehand torch angle to define a weld 72. The result was that oxide films 73 were entrapped in the weld and weakened such weld dictating that forehand torch angles cannot be used.

Backhand torch angles of 6°, 12°, 15°, and 18° have been actually tried and all of these backhand angles allowed smooth molten metal flow and provided sound welds substantially free of entrapped oxides. It is believed that backhand torch angles ranging between 1° and 25° will provide acceptable results.

Another of the above-mentioned primary features of this invention is the utilization of an inert shielding gas. Several types of shielding gases and mixtures thereof have been investigated; it has been found that commercially pure helium, used above, provides the best results, although argon also provides satisfactory results.

Some of the shielding gases which were investigated are shown on the following Table II which presents a summary of effect of shield gas composition on welds.

TABLE II

EFFECT OF SHIELD GAS COMPOSITION ON WELDS

| Gas | Flow Rate cfh | Backhand Torch Angle, ° | Weld Current Amps | Arc Volts | Weld Rate ipm | Weld Penetration IN. × 64 | Remarks |
|---|---|---|---|---|---|---|---|
| Helium | 150 | 12 | 296 | 34 | 5 | 20–21 | Cross section satisfactory |
| 75%He-25%A | 150 | 12 | 326 | 33 | 4.5 | 16–17 | Included oxide films |
| 75%He-25%A | 150 | 6 | 306 | 34 | 4.5 | 16 | Included oxide films |
| Argon | 100 | 6 | 324–332 | 30 | 4.5 | 4–10 | Included oxide films |
| Argon | 100 | 12 | 340 | 28 | 4.5 | 10–13 | Cross-section satisfactory |
| Argon + 1% $O_2$ | 100 | 12 | 328–348 | 22 | 4.5 | — | Teardrop deposits |
| Argon + 0.25% $O_2$ | 100 | 12 | 344–352 | 24 | 4.5 | 11–19 | Included oxide films of narrow cross section |

The welding tests presented in Table II above were done on 1-11/16 inch 5083-0 aluminum alloy plate. The grooves along the members welded were similar to groove 31 of members 21 with such grooves being ¾ inch deep and having a 60° included angle therebetween. The electrode was made of 5356 aluminum alloy and was 3/32 inch in diameter. The last column of Table II indicates the character of the resulting weld cross-section, and the notation in this last column stating "included oxide films" indicates an unsatisfactory weld caused by entrapped oxide films similar to the films 73 shown in FIG. 10 and produced by a forehand torch angle. The tests showed that for a given electrical current and torch travel speed, 100% commercially pure helium produces the deepest penetration.

Where mixtures of argon and oxygen were used, unsatisfactory welds resulted. In particular, use of argon plus 1% oxygen produced a teardrop deposit. It appears that the oxygen promoted formation of an oxide in a weld crater rather than allowing the weld metal to flow out. A series of teardrop-shaped masses of weld metal were defined in vertically stacked relation along the associated groove whereby the resulting weld was not satisfactory.

Lowering the oxygen content to 0.25% allowed a continuous comparatively smoother weld to be formed but the weld puddle was turbulent during welding and oxide films were entrapped and included in the solid weld. In those instances where two gases are provided as a shielding gas the two gases are mixed using apparatus and techniques which are well known in the art and supplied through conduit 45.

The depth of a groove such as 31 or 32 is precisely controlled and is usually generally of the order of ⅛ to ½ the thickness of the members being welded and the included angle between side walls of each groove is also controlled in a precise manner. Such included angle is defined by a cooperating pair of groove-defining surfaces, either 25 or 27, and may range between 45° and 75°, with an angle of roughly 60° being preferred. Similarly, the depth of each groove thus defined is controlled as a function of the thickness 22 of members 21 being welded. For 1-11/16 inch thick members the groove depth is preferably ⅝ inch.

However, it will be appreciated that the selection of groove geometry, weld current, weld travel rate, and wire feed speed is a matter of balancing weld penetration against groove fill. Violation of such a balance by using too small a groove or excessive electric current can result in molten metal spill-out or burn-through. Similarly, a large groove angle will cause lack of fill and possibly drooping weld reinforcement because the groove side walls are needed for molten metal support in cooperation with the oxide support skin formed during the welding operation. Likewise, it will be appreciated that a low electric current can prevent the formation of a deep penetrating arc. Although an increase in weld current ordinarily increases weld penetration, a less than proportional increase occurs in vertical melting rate; therefore, the travel speed of the torch 36 cannot be correspondingly increased by increasing current without the danger of shorting out the electrode on the leading edge of the weld crater.

Figure 11:
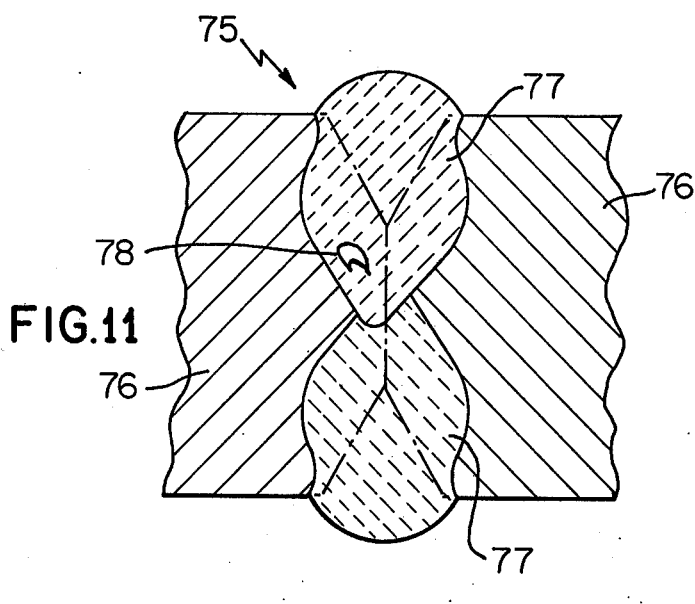
FIG. 11 is a fragmentary cross-sectional view showing a defective weld due to a so-called "wormhole" defect caused by improper feeding of the electrode.

Electrode wire feed speed WFS is the rate at which the electrode wire is fed during a welding operation and is an important variable which must be controlled. If the wire feed speed is improperly set, so-called wormhole defects may be produced, i.e., random voids are produced in the weld cross section. To illustrate this point reference is made to FIG. 11 of the drawings which shows a weld structure 75 defined by welding a pair of 5083-0 aluminum alloy members 76 to produce a pair of main welds 77. The top weld 77 was produced using an improper WFS resulting in a wormhole 78.

One solution to the problem of wormholes which may be used is to raise the molten metal shelf by increasing the WFS. However, this is not an ideal solution, particularly with a drooping electric power supply, because the electric current is also increased which can result in burn-through on a single pass.

Figure 12:
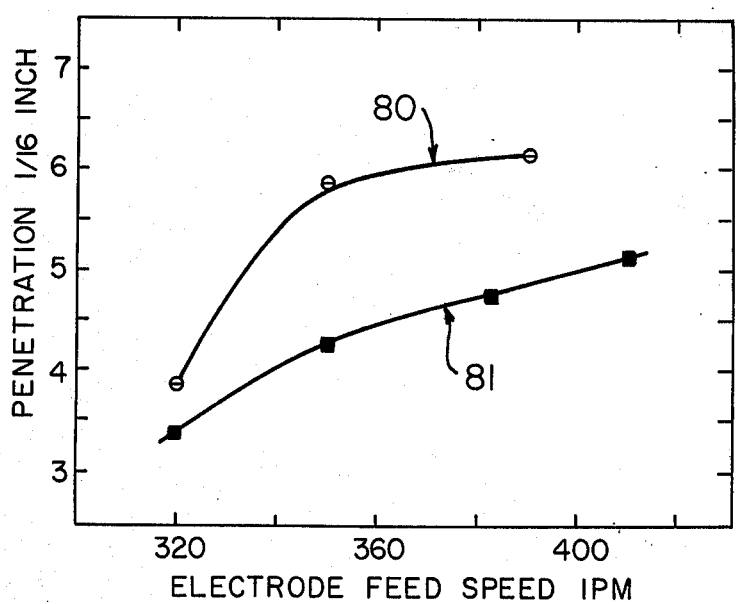
FIG. 12 is a chart showing electrode feed speed versus weld penetration.

WFS also affects weld penetration apart from the current increase. FIG. 12 shows two actual test curves 80 and 81 representing 6 and 8 inches per minute weld travel speeds respectively; and, it will be seen that proper selection of WFS can increase weld penetration by as much as 0.15 inch. For these tests, weld current increased 4-5% over the range of wire feed speed investigated, while weld penetration increased 50%-60%. It is believed that this marked increase of weld penetration was probably caused by a redistribution of arc energy to the bottom of the weld crater when the WFS was increased.

The method of this invention avoids the problems of included oxide films, wormholes, and poor weld penetration by proper control of the variables affecting these items. Thus, the method of this invention results in the provision of welds of a high order which will meet known welding standards and may be used with confidence in industry. In general, the weld structure produced by the method of this invention results in the side walls of the weld being columnar, with the weld root area consisting of fine equiaxed grains. The central portion and bulk of the weld are composed of twinned grains. It was found that a twinned structure can be formed in 5000 and 7000 series aluminum alloys when the welding speed is either low or high; however, it has been found from the mechanical properties of the welds that the presence of twinned grain structure should be of no concern.

The room temperature properties of welds made in accordance with this invention are compared with other vertical welding processes in the following Table III.

TABLE III

| Process | Filler | Tensile Strength (ksi) | Yield Strength (ksi) | % Elong. |
|---|---|---|---|---|
| This Invention | 5356 | 42.8 | 20.8 | 23.3 |
| Electrogas | 5356 | 40.3 | 17.9 | 18.0 |
| Multipass | 5356 | 41.1 | 21.1 | 17.8 |
| This Invention | 5183 | 42.8 | 19.7 | 22.0 |
| Electrogas | 5183 | 42.2 | 17.9 | 22.3 |
| Multipass | 5183 | 44.3 | 20.3 | 21.5 |
| 5083-0 Minimums | | 39.0 | 17.0 | 16.0 |

The above data are representative of welds made using 5083-0, 1-11/16 inch plate.

The method of this invention enables the welding of comparatively thick, i.e., in excess of 0.5 inch thick, aluminum members at costs heretofore unknown for comparable welds. For example, it was found that the method of this invention may be used to provide high quality welds using 1 11/16 inch aluminum members at approximately one-half the cost of other techniques known prior to this invention.

The method of this invention may be used to weld comparatively thick members such as plates, or the like, made of aluminous materials and excellent results have been obtained welding members made of 5083, 5086 and 5456 aluminum alloys. Similarly, with members made of these alloys, the electrode wire is preferably 5356 or 5183 aluminum alloy. However, it will be appreciated that the method of this invention may be utilized to weld together aluminous members regardless of their detailed composition while utilizing electrodes made of compatible materials.

As presented herein the method of this invention is particularly useful in welding together aluminous members which are arranged substantially vertically and with the welds themselves being defined substantially vertically in the substantially vertically arranged members. However, it is to be understood that the terms "substantially vertically" of substantially vertical as used in this disclosure define that members being welded, welds in such members, or both welds and members, are arranged at any one of an infinite number of attitudes from a 45° inclination to a horizontal plane to perfectly vertical or 90° inclination to such horizontal plane.

While present exemplary embodiments of this invention, and methods of practicing the same, have been illustrated and described, it will be recognized that this invention may be otherwise variously embodied and practiced within the scope of the following claims.

What is claimed is:

1. A method of welding a substantially vertically oriented pair of aluminum members, each of said members having a thickness of at least about 0.5 inches, and each of said members having a land defining surface and a groove defining surface, the land defining surface of one said member being positioned against the land defining surface of the other said member, whereby the groove defining surface of one said member cooperates with the groove defining surface of the other said member to define a substantially vertically oriented groove, the groove defining surface of each said member being characterized such that said groove has a depth of about ⅛ to about ½ the thickness of each of said members and an included angle in the range of about 45° to about 75°, which method comprises: placing a gas-metal arc torch having a consumable aluminum electrode and means for supplying a shielding gas therearound with said consumable electrode in said groove, generating a welding arc characterized by a weld current ranging between 200 and 400 amperes and an arc voltage ranging between 20 and 40 volts, and moving said torch substantially vertically along said groove while holding said torch at a backhand torch angle ranging between 1° and 25° and feeding said consumable electrode and said shielding gas at rates effective to produce weld metal in said groove having an outside oxide support skin which acts as a sole support for said weld metal during its solidification, said torch being moved at a rate which ranges between 3 and 10 inches per minute and is effective to substantially fill and groove with said weld metal in a single pass.

* * * * *